Figure 1:
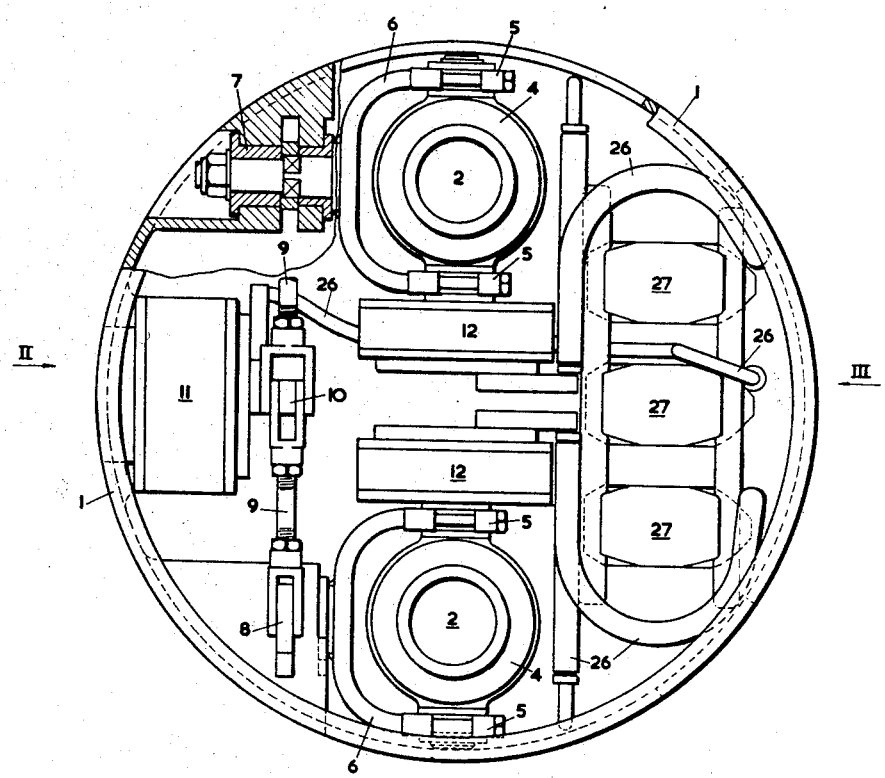

United States Patent Office 3,410,505
Patented Nov. 12, 1968

3,410,505
CONTROL SYSTEMS FOR AERIAL MISSILES AND LIKE VEHICLES
Walter James Gildon, 16 The Drive, Bexley, Kent, England, and Thomas George Ferguson, 8 The Old Walk, Otford, Sevenoaks, Kent, England
Filed Oct. 16, 1959, Ser. No. 847,017
Claims priority, application Great Britain, Oct. 17, 1958, 33,304/58
4 Claims. (Cl. 244—3.22)

This invention relates to control systems for aerial missiles and like vehicles.

In the early stages of flight of an aerial missile, when its velocity is low, guidance by means of the aerodynamic forces on movable wings or flaps is unsatisfactory. For a long range missile this may not be a serious drawback since errors at or near the time of launching can usually be corrected during the later stages of flight. With a short range missile, however, there may well be insufficient time to apply the necessary corrections aerodynamically and effective guidance during the early, low velocity stages of flight is essential. Such guidance can only be achieved by employing reaction forces derived from jets.

The object of the present invention is to provide a control system for aerial missiles and like vehicles which system will guide the missile effectively in the early stages of flight and which will control pitch, yaw and roll of the missile.

The invention therefore comprises a control system for aerial missiles and like vehicles wherein is provided a plurality of venturi, the jets from at least two of which can be deflected relative to the missile axis and to one another to control the flight of the missile.

In one form of the invention two similar venturi, which may conveniently be the main venturi for driving the missile, are arranged symmetrically, on diametrically opposite sides of the missile axis. With each venturi is associated a deflector tube surrounding the venturi exit and so mounted, for example on a universal joint, as to be capable of deflection in any desired direction. Deflection of both tubes in the same direction with respect to the missile axis introduces a transverse component of the reaction thrust of the jets and may be used to control pitch and yaw of the missile whilst deflection in opposite senses introduces a couple about the missile axis and may be used to control roll.

Any number of venturi may be used, some or all of which may have deflecting means. The control jets may if desired be separate from the main driving jets and may be derived from the main motor or a separate reaction motor. The control venturi may be situated at the rear end of the missile or at any other suitable positions such as, for example, at the wing tips.

A control system of this type may be used in a missile having fixed wings. In the early stages of flight, control would be by means of the jets alone but after a sufficiently high velocity has been attained the jets may be used to control the missile incidence and guide the missile by altering the aerodynamic forces on its wings.

Actuation of the deflectors may be by means of pistons operating through a suitable linkage system but in a preferred form operation is through small rotary pneumatic vane actuators such as will be hereinafter described. The pistons or vane actuators may be operated by compressed air through suitable valves which may be controlled by electrical means. The electrical signals for controlling the valves may be transmitted to the missile by known means, such as for example a radio link or by trailing leads from a ground control station.

Figure 2:
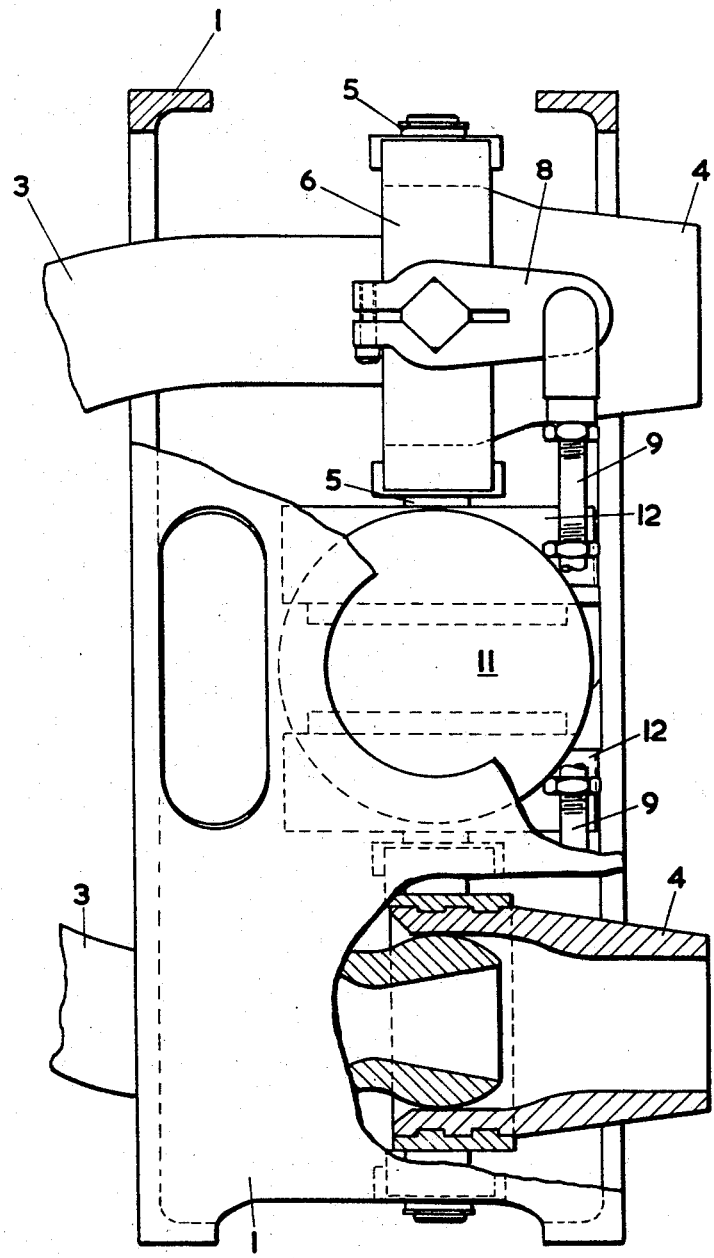
Figure 3:
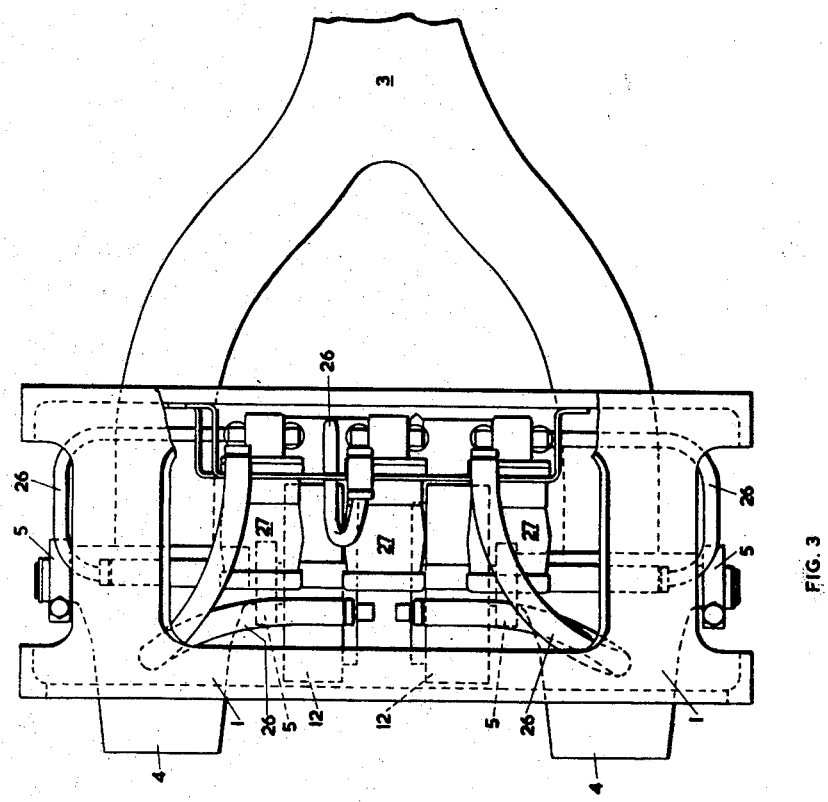
Figure 4:
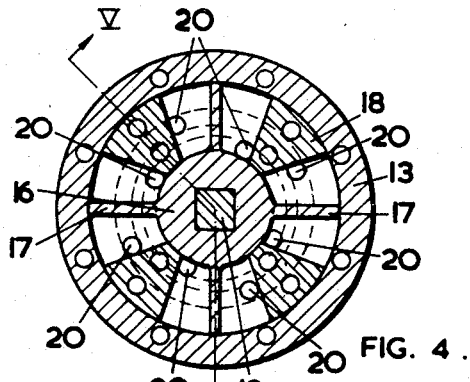
Figure 5:
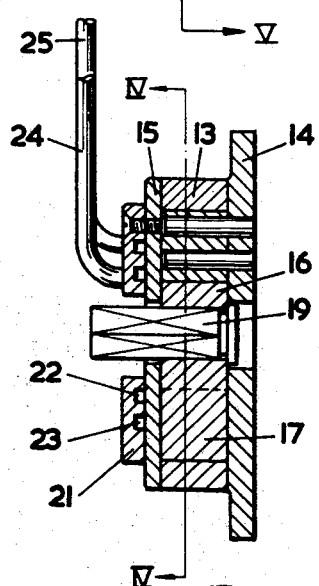
Figure 6:
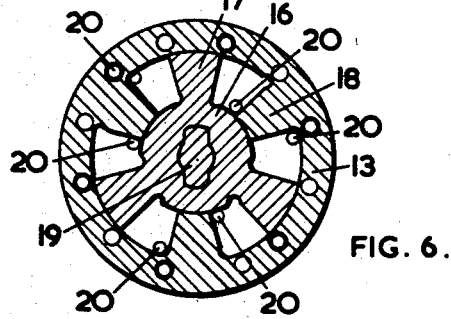
Figure 7:
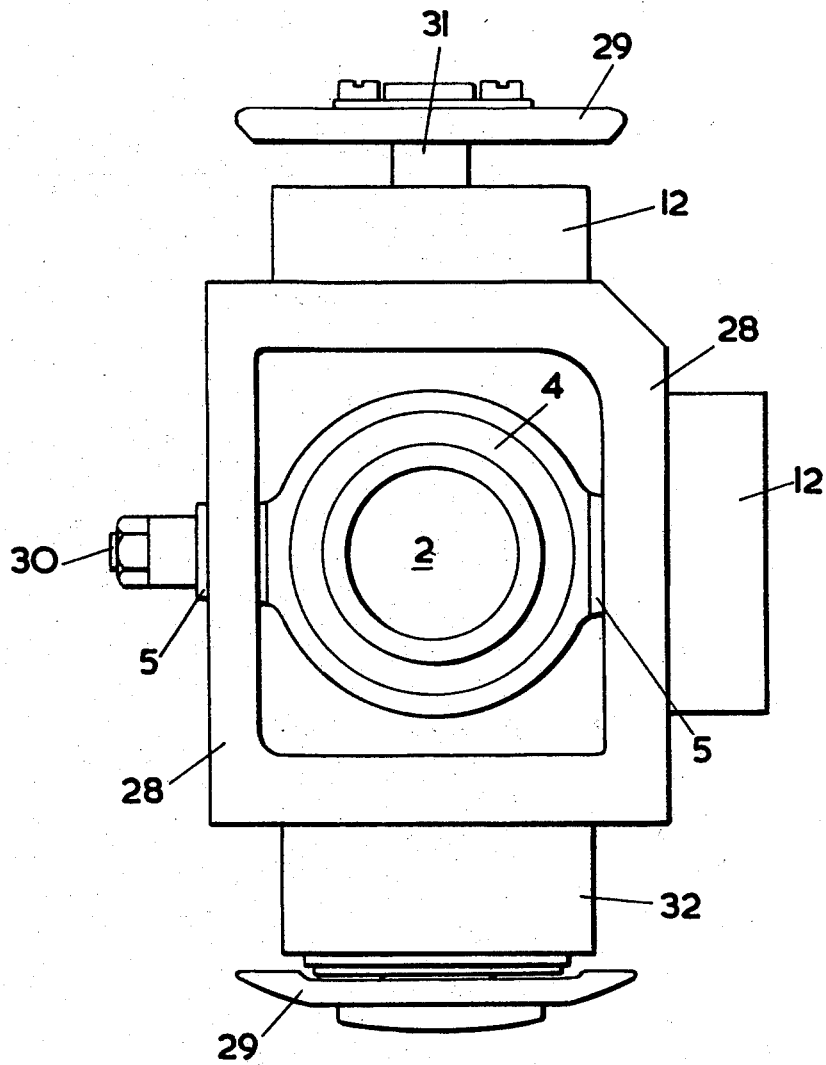
Figure 8:
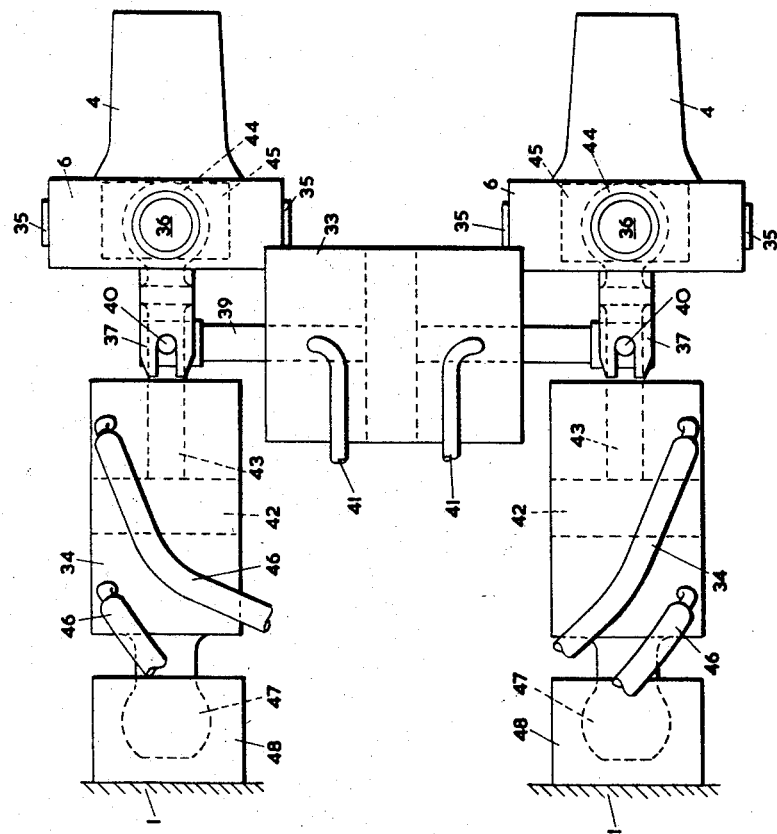

Various forms of control system suitable for a short range guided missile will now be more particularly described by way of example only, with reference to the accompanying drawings in which:

FIGURE 1 is a partly sectioned, rear elevation of a control device,

FIGURE 2 is a partly sectioned, side elevation with part of the frame broken away and viewed in the direction II of FIGURE 1, FIGURE 3 is a side elevation with part of the frame broken away and viewed in the direction III of FIGURE 1, FIGURE 4 is a transverse section of an actuator suitable for use in the control device, taken on the line IV—IV of FIGURE 5, FIGURE 5 is a section on the line V—V of FIGURE 4, FIGURE 6 is a transverse section of an alternative actuator, FIGURE 7 is a rear elevation of a single jet control device, and FIGURE 8 is a schematic view of an alternative form of control device.

In the control device shown in FIGURES 1 to 3 a frame 1, suitable for attachment to the rear end of a missile is provided with two venturi 2 symmetrically spaced on a diameter one on either side of the missile axis, the axes of the venturi 2 being parallel to the missile axis. The venturi 2 are fed through a Y-shaped tube 3 from the main motor. Surrounding the exit of each venturi, and projecting rearwardly thereof, is a deflector tube 4. The inner surface of the forward end of the deflector tube 4 and the outer surface of the venturi tube 2 are formed with a small clearance therebetween to allow free deflection of the deflector tube whilst maintaining a constant clearance gap. The clearance is as small as possible to minimise forward flow of gas through the gap but must be large enough to allow for differential expansion of the venturi and deflector tubes.

Each deflector tube is mounted on bearings 5 in the two arms of a Y-shaped member 6, the axes of the bearings lying in an axial plane of the missile through the two venturi 2. The stalk of the Y-shaped member 6 is mounted in a fixed bearing 7 whose axis lies in a transverse plane of the missile and perpendicular to the diameter of the missile through the two venturi 2. The deflector tube 4 is thus mounted in a universal joint and is capable of deflection in any direction by a suitable combination of rotations about two mutually perpendicular axes.

The stalks of the two Y-shaped members 6 of the deflector tube mountings each carry a crank 8, the outer ends of the two cranks being connected by a linkage 9 so that deflection of the two deflector tubes 4 in the axial plane of the missile will always take place in the same sense. The linkage 9 is connected by a third crank 10 to the axle of a pneumatic vane actuator 11 which can impart a deflection, through the linkage 9 to the two deflector tubes 4 simultaneously.

For deflection perpendicular to the axial plane of the missile each deflector tube 4 has a separate, smaller, vane actuator 12 fixed to one arm of the associated Y-shaped member 6 in axial alignment with the deflector tube bearing 5, and the axle of the actuator is connected directly to the axle of the deflector tube 4. The two deflector tubes 4 are thus capable of deflection in the same or in opposite senses by their separate actuators 12.

Each actuator, as shown in FIGURES 4 and 5, has a cylindrical casing 13 secured to a base disc 14 and a cover 15 and, within the casing 13, a hub 16 carrying four vanes 17. Each vane 17 lies in a separate compartment, the compartments being divided off by sector shaped members 18 dowelled to the base 14. All the mating surfaces are carefully ground so that the sector shaped dividing members 18 and the cylindrical casing 13 are in substantially airtight contact with one another and with the base 14 and cover 15; while the minimum clearances necessary for free rotation of the hub and vane assembly 16, 17 are allowed between the outer edges of the vanes 17 and the inner surface of the casing 13, between the hub 16 and the inner surfaces of the dividing members 18 which act as a bearing for the hub 16 and between the two end surfaces of the hub and vane assembly 16, 17 and the base 14 and cover 15 respectively. The hub 16 carries an axle 19 which projects through an axial hole in the cover 15. Eight further holes 20 are drilled through the cover 15 four on each of two different radii. The holes 20 in each set of four communicate one with each compartment adjacent the dividing members 18, the holes in one set of four being clockwise and those of the other set anti-clockwise of the vanes 17. An outer cover 21 is secured in airtight contact with the cover 15 and has an axial hole to accommodate the axle 19. The inner surface of this outer cover 21 has two circular grooves 22, 23 at radii corresponding to those of the two sets of holes 20 in the cover 15. Two pipes 24, 25 are sealed into the outer cover 21, one communicating with each groove 22, 23 and thence, through the holes 20 in the cover 15, with each compartment of the actuator. Thus air entering the actuator through one pipe 25 will deflect the vanes 17 in a clockwise direction and air entering through the other pipe 24 will produce an anti-clockwise deflection.

In the alternative form of actuator, shown in FIGURE 6, the wedge shaped dividing members 18 are formed integrally with the casing 13 and divide the actuator into three compartments each containing a vane 17. The vanes 17 are thicker than in the version shown in FIGURES 4 and 5 giving increased coverage of the leakage path between the outer surfaces of the vanes 17 and the inner surface of the casing 13. In other respects the actuator is similar to that shown in FIGURES 4 and 5.

The pipes 24, 25 from each actuator 11, 12 are connected by tubes 26 (FIGURES 1 and 3) to a compressed air supply (not shown) carried by the missile through an electrically operated valve 27 of a known type which controls the flow of air into and out of the actuator and hence controls the deflection of the actuator. The valves 27 are controlled by electrical signals from a known type of ground control unit, the signals being transmitted through trailing wires (not shown). For a longer range missile a radio link may be used instead of trailing wires.

Although in the particular device described the two deflector tubes 4 are linked for deflection in unison in one plane and thus require a total of three actuators 11, 12 for complete control of the missile, the link may be omitted in which case a fourth vane actuator would be required. Such an alternative arrangement may be necessary if the control venturi are some distance apart as, for example, the aforementioned alternative arrangement having the venturi at the wing tips. In such a case each deflector tube would have two actuators 12; one carried, as described, on one arm of the mounting and the other being connected to the axle of the mounting. Such an arrangement is shown in FIGURE 7. A deflector tube 4, surrounding a venturi 2, is carried in bearings 5 in two opposite arms of a substantially rectangular mounting frame 28 which is, itself, rotatably mounted in brackets 29. The axes of rotation of the deflector tube 4 and the frame 28 are mutually perpendicular. Two vane actuators 12 are mounted, one on each of two adjacent arms of the frame 28 and axially aligned with the axes of rotation of the deflector tube 4 and the frame 28. The axle of one actuator is directly connected to the axle 30 of the deflector tube 4, the axle of the second actuator being connected to a fixed boss 31 carried in one of the brackets 29. The air supply to the actuators 12 may be carried, as previously described with reference to FIGURES 1 and 3, through control valves and thence by flexible pipes directly to the actuators or the air supply may be connected to an inlet in an enlarged boss 32 and thence through suitable channels (not shown) within the boss 32 and the frame 28 to the actuators 12.

In the arrangement shown schematically in FIGURE 8 the vane actuators are replaced by piston actuators 33, 34. Two deflector tubes 4 are mounted in Y-shaped members 6, the axles 35 of the tubes 4 being perpendicular to the stalks 36 of the Y-shaped members 6. The stalk of each Y-shaped member 6 carries a lever arm 37 having a slot in its outer end. A piston actuator 33, mounted between the two lever arms 37, contains a piston 38 from each end of which extends a rod 39 having, near its outer end, a pin 40 which engages the slot in one of the lever arms 37. Air may be fed into the actuator on either side of the piston 38 through one or other of two pipes 41, the resultant movement of the piston 38 and rods 39 causing the lever arms 37, and hence the Y-shaped members 6 to rotate about the axes of the stalks 36. The slot in the lever arm 37 permits radial movement of the pin 40 relative to the stalk 36 as the rotation occurs. Rotation of the deflector tubes 4 about the axes of the axles 35 is produced by means of the two smaller piston actuators 34 each of which contains a piston 42 connected to a rod 43 which has at its outer end a ball 44. Each ball 44 engages in a housing 45 attached to the side of a deflector tube 4 opposite the stalk of the associated Y-shaped member 6. The ball joints 44, 45 permit relative rotation between the deflector tubes 4 and the rods 43. Each piston 42 may be moved in either direction by feeding air into the actuator through one or other of the pipes 46. In order to permit lateral movement of the balls 44, which movement will occur as the deflector tubes 4 are rotated each actuator 34 is rotatably mounted on the frame 1 by means of a ball ended rod 47 attached to the actuator, the ball end of the rod being mounted in a housing 48 fixed to the frame 1.

The arrangements (not shown) for supplying air to the piston actuators 33, 34 may comprise a system of tubes and valves substantially similar to that used for supplying the vane actuators and previously described with reference to FIGURES 1 and 3.

Any suitable gas under pressure may be used for driving the deflector tube actuators and may be derived from a container of compressed gas or, alternatively, use may be made of hot gases tapped off from a reaction motor and supplied to the actuators through suitable valves as hereinbefore described.

We claim:
1. A control system for aerial missiles and like vehicles having two control venturi symmetrically situated one on either side of and parallel to the missile axis; two pairs of mounting brackets fixed to the missile, one bracket on either side of each venturi; a rectangular frame surrounding each venturi and rotatably mounted in the associated pair of brackets, the axis of rotation being perpendicular to the axial plane of the missile through the venturi; a tubular deflector surrounding and extending rearwardly of each venturi exit and rotatably mounted in the associated rectangular frame, its axis of rotation being perpendicular to that of the frame; a pressure fluid operated, rotary vane actuator mounted on each rectangular frame in alignment with the axis of rotation of the frame and operatively connected to the frame and one mounting bracket, for deflecting the frame; a second similar actuator attached to an adjacent arm of each frame and operatively connected to the frame and the tubular deflector, for rotating the deflector relative to the frame; an electrically operated control valve for controlling the supply of pressure fluid to each actuator, and means for individually operating each tubular de- flector by the corresponding electrically controlled valve to govern direction and to compensate for pitch, yaw and roll of the missile.

2. A control system for aerial missiles and like vehicles which system comprises two venturi symmetrically situated one on either side of and parallel to the missile axis; a frame surrounding both venturi; two bearings mounted in the frame, their axes being perpendicular to the axial plane of the missile through the venturi, one interesting each venturi axis; a Y-mounting rotatably carried in each bearing and having two arms extending one on either side of the associated venturi; a tubular deflector surrounding and extending rearwardly of each venturi exit and rotatably mounted in the arms of the associated Y-mounting; a pressure fluid operated, rotary vane actuator mounted on one arm of each Y-mounting and operatively connected to the associated deflector; a third pressure fluid operated, rotary vane actuator mounted in the frame between the two bearings; a linkage operatively connecting the third actuator to both Y-mountings for deflecting the said Y-mountings, in unison, about the axes of the bearings; an electrically operated control valve associated with each actuator for controlling the supply of pressure fluid thereto, and means for individually operating each tubular deflector by the corresponding electrically controlled valve to govern direction and to compensate for pitch, yaw and roll of the missile.

3. A control system for aerial missiles and like vehicles which system comprises two venturi symmetrically situated one on either side of and parallel to the missile axis; a frame surrounding both venturi; two Y-mountings rotatably mounted in the frame, one associated with each venturi and each having two arms extending one on either side of the associated venturi, the axes of rotation being perpendicular to the axial plane of the missile through the venturi, one intersecting the axis of each venturi; a tubular deflector surrounding and extending rearwardly of each venturi exit, and rotatably mounted in the arms of the associated Y-mounting; a lever arm fixed to each Y-mounting; a pressure fluid operated, piston actuator mounted on the frame between the said lever arms; a rod extending from each side of the actuator piston, each rod engaging one of the lever arms for deflecting the Y-mountings and the associated deflectors, in unison, about the axes of rotation of the Y-mountings; two further pressure fluid operated, piston actuators, one associated with each deflector their axes being substantially parallel to the missile axis; a ball and socket mounting connecting each further actuator to the frame; a deflector rod extending from one side of the piston of each further actuator to the associated deflector; a ball and socket joint connecting each deflector rod to the associated deflector; an electrically operated control valve for controlling the supply of pressure fluid to each of the three actuators, and means for individually operating each tubular deflector by the corresponding electrically controlled valve to govern direction and to compensate for pitch, yaw, and roll of the missile.

4. A control system for aerial missiles and like vehicles which system comprises two control venturi symmetrically situated one on either side of and parallel to the missile axis, a tubular deflector surrounding and extending rearwardly of each venturi exit, a universal joint mounting for each tubular deflector, a plurality of pressure fluid operated actuators for regulating the movement of the deflectors in unison in one plane and independently in another plane spaced 90° therefrom, each actuator having a closed end cylinder divided into a plurality of radial compartments, an axle extending axially through the cylinder and rotatable relatively thereto, a radial vane in each compartment fixed to the axle, the rotatable and fixed parts of the actuator being in substantially fluid tight connection, two fluid supply pipes each connecting with all compartments, one on the clockwise and the other on the counterclockwise side of the vanes, an electrically operated control valve associated with each actuator for controlling the supply of pressure fluid to each actuator, and means for individually operating each tubular deflector by the corresponding electrically controlled valve to govern direction and to compensate for pitch, yaw and roll of the missile.

References Cited
UNITED STATES PATENTS

| | | | |
|---|---|---|---|
| 2,499,401 | 3/1960 | Madden | 60—35.55 |
| 2,868,478 | 1/1959 | McCloughy | 244—14 |
| 3,004,734 | 10/1961 | Radford | 244—14 |
| 2,910,953 | 11/1959 | Karig | 114—23 |
| 2,778,338 | 1/1957 | Shafer | 60—52 |

BENJAMIN A. BORCHELT, *Primary Examiner.*

V. R. PENDEGRASS, *Assistant Examiner.*